(12) United States Patent
Ward

(10) Patent No.: US 8,154,956 B2
(45) Date of Patent: Apr. 10, 2012

(54) MARINE ACOUSTIC SOURCE OPERATION

(75) Inventor: David Ward, Maidstone (GB)

(73) Assignee: TangleSolve LLP, Maidstone (GB)

( * ) Notice: Subject to any disclaimer, the term of this patent is extended or adjusted under 35 U.S.C. 154(b) by 192 days.

(21) Appl. No.: 12/633,307

(22) Filed: Dec. 8, 2009

(65) Prior Publication Data

US 2010/0165786 A1     Jul. 1, 2010

(51) Int. Cl.
*G01V 1/137*     (2006.01)
*H04B 17/00*    (2006.01)
(52) U.S. Cl. ............................ 367/144; 367/13; 181/120
(58) Field of Classification Search .................. 367/144, 367/13; 181/107, 120
See application file for complete search history.

(56) References Cited

U.S. PATENT DOCUMENTS 4,210,222 A * 7/1980 Chelminski et al. .......... 181/107
4,402,382 A * 9/1983 Mollere ........................ 181/120

FOREIGN PATENT DOCUMENTS

GB          2394046 A * 4/2004

* cited by examiner

*Primary Examiner* — Ian Lobo
(74) *Attorney, Agent, or Firm* — Barnes & Thornburg LLP

(57) ABSTRACT

Data is collected from the integral timing sensor of a marine acoustic source such as an airgun, typically used for seismic measurements. Artefacts in the firing data are used to monitor the firing pressure and optionally the correct functioning of the marine acoustic source.

6 Claims, 7 Drawing Sheets

MARINE ACOUSTIC SOURCE OPERATION

The invention relates to a method of operation of a marine acoustic source and apparatus for testing a marine acoustic source.

BACKGROUND ART

In marine seismic exploration an acoustic source may be used to produce an acoustic signal. Typically, a number of airguns are deployed. Each airgun produces a pressure wave whose signature is dependent on a number of factors, including the volume of air released, the original pressure of air within the airgun and the hydrostatic pressure of the surrounding water. In addition, the water depth has an effect since a wave travelling up from the airgun may be reflected at the water/air interface at the surface.

The array produces a pressure wave which is a combination of each individual gun element. A number of sensors detect reflections from within the earth's crust to produce a dataset for analysis.

A significant amount of processing is required to interpret and clarify the data. Since the dataset is a time series of reflections of the original array signature, a signature deconvolution is used to simplify the data signal. This deconvolution requires the source signal to be known. Such source signatures may be derived in advance or measured.

For the highest quality data, it is important both that the source signature is as close as possible to the design signature and be achieved consistently from shot to shot.

Airguns are commercially available, and typically have two chambers containing compressed air. The larger chamber contains the main air volume which is to be released into the water to produce the pressure wave which is the airgun's purpose. This document will refer to this chamber as 'the firing chamber'.

A second, smaller chamber, having an electrical solenoid valve control system, is used to cause a pressure imbalance between the two chambers and cause a 'shuttle' or 'sleeve' to move, releasing the air from the firing chamber into the surrounding water. This chamber will be referred to as 'the control chamber' in this document.

An airline may be used to fill the chambers and an electrical sensor used to detect the exact firing time of the airgun. US 2007/0263489 describes such an airgun.

To achieve repeatable results, it is important that the individual sources (the airguns which combine together to produce the 'array') need to be accurately controlled. It is in particular important that each airgun fires at the same time, and only at that time. Each gun needs to be at the design depth, with the design volume of air at the design pressure.

To this end, a source synchronizer may be used which uses the signals from the detection sensor to adjust the firing of individual airguns in a feedback loop. The depth of each sensor may be measured by depth transducers included in the array. The pressure may be measured by pressure transducers either attached to the airline or indeed in a vessel towing the array.

In spite of much work in developing reliable airguns and repeatable measurements, a number of problem areas exist.

Firstly, air leaks may occur in the supply system. Large air leaks may of course be detected by pressure sensors which may be placed within the air supply to the gun. Small air leaks may however go unnoticed in particular because of the large volume of air used to supply the airguns. Small leaks can however give rise to aerated water in the proximity of the airguns which affects the surface reflected pressure wave propagation, and also leads to firing airguns at considerably lower pressure than is being measured by the pressure sensors in the system.

Thus, such small air leaks can be undetectable by usual means but still cause considerable data degradation.

A second problem that may occur is faulty electrical connections. The electrical connections to airguns are in a challenging environment, being towed underwater and further being subject to the shock from the pressure wave being produced on activation of the airguns. They may suffer from inductive or capacitive pick-up from neighbouring sensor, solenoid or auxiliary cabling, leakage to earth or to neighbouring connectors, intermittent connector or short circuits, or signal corruption.

The problem is made more difficult by the vast amount of data that is commonly collected in such systems. It is very difficult, if not impossible, to monitor all the data generated for problems by human observation.

The detection of airgun faults is accordingly important. GB 2 445 842 teaches comparing a measured near field signal measured on a near field transducer with a reference near field signal and checking if the difference exceeds a threshold.

Another approach is provided by GB 2 438 080 which discloses the addition of a pressure sensor into the firing chamber to measure the pressure during discharge of the airgun. However, the addition of such an additional sensor into the charge chamber of an airgun is very difficult to achieve reliably, bearing in mind that the firing chamber of such an airgun is an explosive device. The introduction of any hole or sensor into such a charge chamber can greatly reduce the strength and hence reliability, and the difficulties and expense of introducing an electrical connection and cabling in this harsh environment is at least problematical.

Similar approaches, which also introduce a pressure sensor into the charge chamber are provided by GB 2 394 046 and FR 2 762 398.

A secondary device often used to monitor airgun performance is the near-field hydrophone. This will be placed in the proximity of the airgun, but at such a distance as to be outside the initial air-bubble caused on air expulsion. This distance will be typically one meter from the airgun ports. As the hydrophone is actually measuring the pressure wave from the airgun, this should be the most definitive method to monitor it's performance.

Calculating faults based on near field sensors, i.e. hydrophones separate from the marine acoustic sources, has been proposed in GB2445842 but this requires both a separate near-field sensor (the hydrophone) and is also computationally rather difficult.

There are significant problems in using these devices successfully in a production environment, not least being the physical reliability of the hydrophone itself. The near field sensor is typically a piezo-electric sensor which is subject to damage if it is crystalline, and to desensitisation if it is of piezo-electric plastic materials such as pdvf (Polyvinylidene Fluoride). Further the pressure it is measuring is not only caused by the target airgun, but other airguns in proximity, which may be just as close to the hydrophone, and the reflections from the sea surface, which will vary with sea state and surface wave motion.

Reliability issues such as those described above exist not just with airguns, which are most widely used, but with alternative marine acoustic sources such as waterguns.

SUMMARY OF INVENTION

According to the invention there is provided a method of operating a marine acoustic source, comprising:

triggering the firing of the marine acoustic source;

collecting firing data from a timing sensor integrated into the marine acoustic source; and monitoring the firing data to detect the firing time of the marine acoustic source;

wherein the method further comprises signal processing the firing data to monitor at least one artefact in the firing data that is dependent on the firing pressure in the marine acoustic source and/or the correct functioning of the marine acoustic source.

Instead of introducing a pressure sensor into the charge chamber as in prior approaches, the invention makes use of the timing sensors already integrated into existing airguns. Such timing sensors are intended for use in providing timing information regarding the exact time of firing of the airgun, and are typically arranged in or around the control chamber.

The inventors have discovered that although the timing sensors do not measure the pressure directly, there are artefacts in the data output by the timing sensors that allow the pressure to be estimated. In some cases good measurements of the pressure can be determined, in other cases the measure of the pressure is not particularly accurate, but still sufficiently accurate to detect when an airgun is not performing correctly.

By monitoring the timing sensor not merely to determine the firing time but also to determine additional properties of the marine acoustic source, the pressure within the marine acoustic source on firing may be monitored and/or the correct functioning and reliability of the marine acoustic source may be determined.

The inventors have realised that this may be achieved without the need for monitoring a hydrophone, or by introducing further sensors into the environment, but instead by simply using the timing sensor itself, conventionally used to measure the firing time.

The method according to the invention is both easier and does not require an additional sensor.

The method may include in particular generating a firing pressure value from the results of signal processing the timing sensor data. In this way, firing pressure can be measured at the marine acoustic source using the timing sensor without requiring additional sensors and cabling to be included.

The artefact may be chosen depending on the properties of the timing sensor, and the particular details of operation of the airgun type For some types of airgun a suitable artefact is the root mean square amplitude of an oscillating sensor waveform after firing. Alternatively the artefact may be the time between the firing time and the time the marine acoustic source is re-cocked and re-sealed.

The invention further proposes a method of ensuring that the time series data used during the signal processing is fit for purpose, i.e. does not suffer from defects caused by failures of the sensor, airgun or data transmission system. This method may be extended to other data types within the airgun system such as hydrophone data to verify performance and identify malfunctions. As well as or instead of monitoring and providing a value for the firing pressure, the signal processing may monitor a plurality of artefacts in the data that are dependent on the correct functioning of the marine acoustic source, the artefacts being measured on a [time] sequence of samples of firing data. The artefacts may be:

a) the root mean square value of the amplitude of oscillations in the firing data;

b) the mean of the absolute difference between adjacent samples; and c) the standard deviation of the difference between adjacent samples.

These artefacts are chosen so that they may be calculated from a moving window of digitised data. If all three artefacts fall within nominal ranges, there is a high probability of correct operation.

The signal processing may report a fault condition if at least two of the artefacts a) b) and c) fall outside respective predetermined ranges of values. In particular acceptance criteria on the data quality may be used to verify the data for use in firing pressure determination.

The invention also relates to a monitoring system for a marine acoustic source.

For a better understanding of the invention, embodiments will now be described, purely by way of example, with reference to the accompanying drawings, in which.

Figure 1:
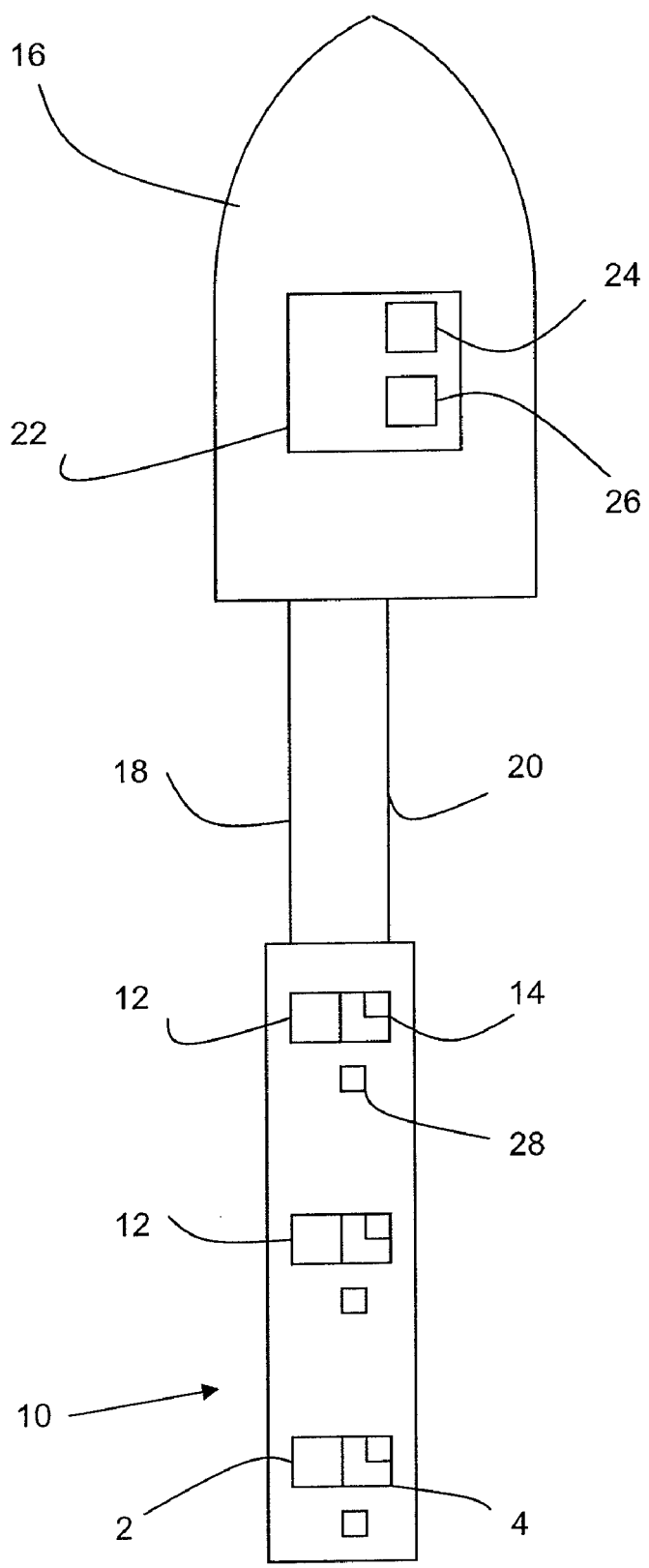
FIG. 1 illustrates an embodiment of the invention.

Referring to FIG. 1, an array 10 of airguns 12 has a timing sensor 14 for each airgun 12, integrated in the airgun. Each airgun 12 has a firing chamber 2 and a control chamber 4; the timing sensor 14 is integrated into the control chamber. Each airgun 12 is also associated with a near field hydrophone 28. The airguns 12 and timing sensors 14 are towed by control vessel 16, with airlines 18 and electrical connectors 20.

A monitoring system 22 on the control vessel 16 includes software code 24 to control the monitoring system 22 to take data from the timing sensors 14, to carry out data processing and to store the processed data in data store 26.

Figure 2:
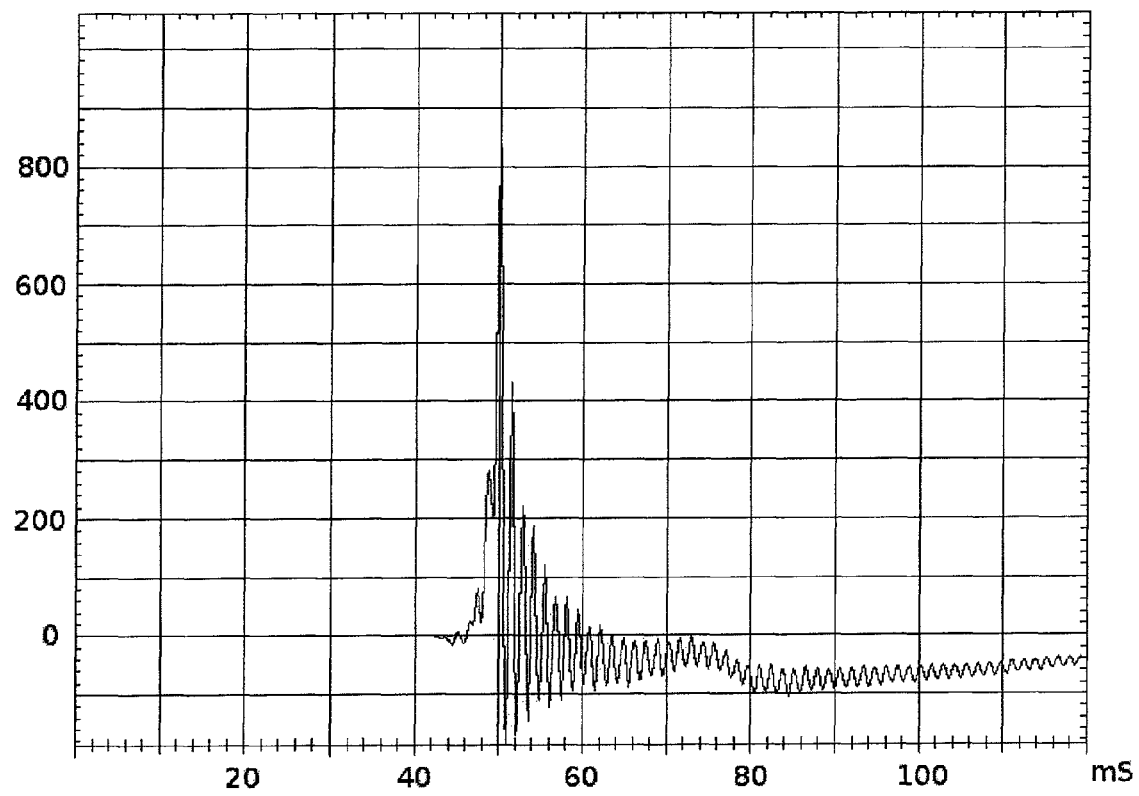
FIG. 2 illustrates data captured using a "Bolt" airgun.

FIG. 2 illustrates the raw data captured by a timing sensor 14 in a Bolt Airgun 12, manufactured by the Bolt Technology Corporation of Norwalk, Conn. This airgun uses a piezoelectric sensor 14 in air contact with the control chamber of the airgun.

As air is released from the control chamber the sensor exhibits a waveform as shown in FIG. 2. The prominent peak is used for firing detection, i.e. detecting the firing time of the airgun. The rest of the signal is quite complex, representing the pressure changes within the control chamber as the air is expelled.

The inventors have realised that the sensor has no capability for directly measuring a static pressure, but does reproduce a sensor waveform representing changes in pressure. The amplitude of the oscillations of the sensor waveform is in fact proportional to the firing pressure. Accordingly, after calibration of the sensor with at least two pressure values, the root mean square (RMS) amplitude of the oscillations including the firing peak can be used as a measure of pressure within the chamber of the airgun 12 on firing.

Figure 3:
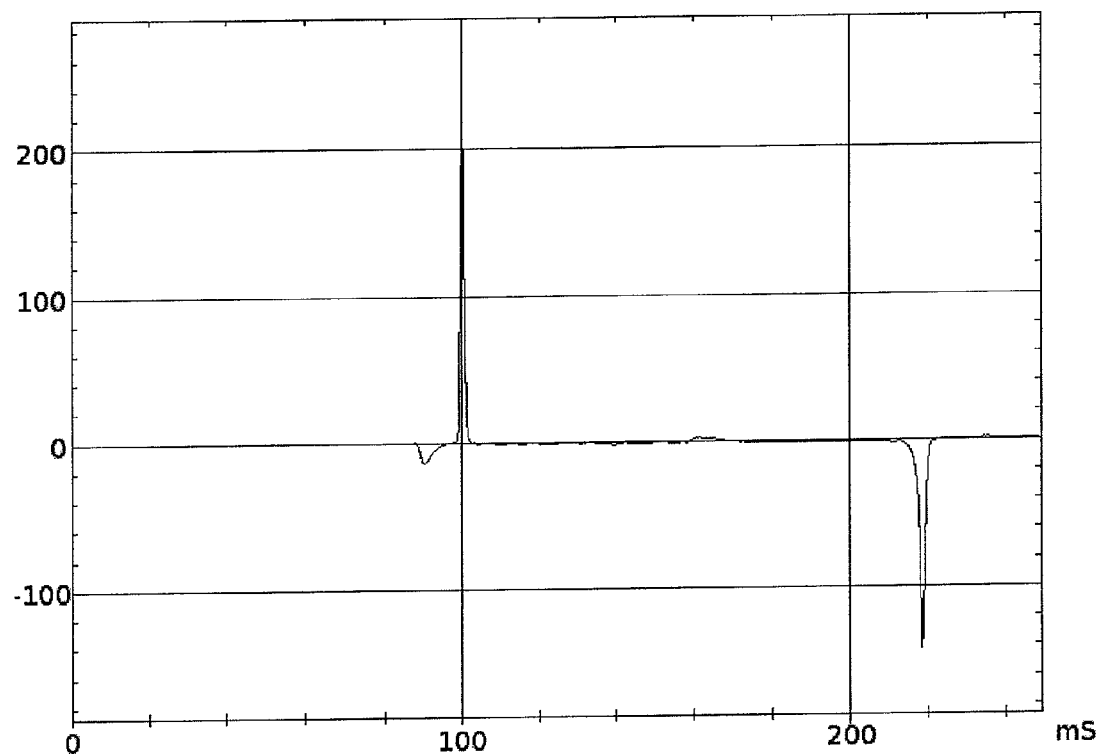
FIG. 3 illustrates data captured using a "Sodera" airgun.

Other designs of airgun 12 may require different approaches. FIG. 3 shows results measured with sensor 14 integrated into the "G-Gun" airgun 12 designed and manufactured by Sercel, of Carquefou, France, formerly Sodera. In this case, the sensor 14 is an electrical coil mounted on the top of the gun which detects physical movement of a mechanical shuttle which moves to allow air to escape from a main chamber. At first sight, the rapid rising edge of the signal gives no opportunity for measuring pressure.

However, the inventors have realised that in this case it is a key design feature that a pressurised "return chamber" re-cocks and re-seals the mechanical shuttle after firing. The sensor 14 detects this return with a pulse of opposite polarity. The time between firing and this second pulse is a function of the air volume and pressure.

In this case, the relationship between time and pressure is not simply linear so the calibration of the pressure against the time requires multiple calibration measurements at different pressures. Nevertheless, after such calibration, the time measured can be used to determine the pressure in the airgun 12 on firing.

Thus, in use, the monitoring system 22 collects the data from the integral sensor 14 in airgun 12 and carries out data processing to determine and then output the pressure. The way in which it does so does depend on the exact type of airgun 12 used, as explained above for two widely used types of airgun.

The monitoring system 22 has additional functionality. In particular, as well as monitoring the pressure, the monitoring system also characterises other characteristics of the waveform to accept it or reject it for further processing.

In particular, the monitoring system 22 monitors the sensors 14 as well as the near field hydrophone 28 to detect autofire events, where the airgun has fired at an unwanted time. It also accepts or rejects the waveform as being suitable for fire detect timing or pressure determination. The system also identifies failing yet still functioning transducers.

A number of attributes are chosen to monitor each waveform. To ease data processing, the attributes are chosen to allow a moving sample window of digital data to derive them. In other words, large amounts of historical data are not required.

In the example, three attributes of data are monitored:
a) the root mean square amplitude in the sample window.
b) the mean of the absolute difference between adjacent samples; and
c) the standard deviation of the difference between adjacent samples.

These three attributes can be used to readily check the waveform source. If all three fall within predetermined ranges of values, i.e. predetermined acceptable ranges, there is a high probability that the data is correct.

The data monitoring and validation can be used to verify the source and quality of the data in an expected waveform. If an unexpected waveform is detected, the attributes may be used to distinguish between noise and features indicating a significant fault. For example, it is useful to distinguish between an airgun autofire, indicating a fault with the airgun, from a transitory data transmission imperfection.

Examples will make this clearer.

Figure 4:
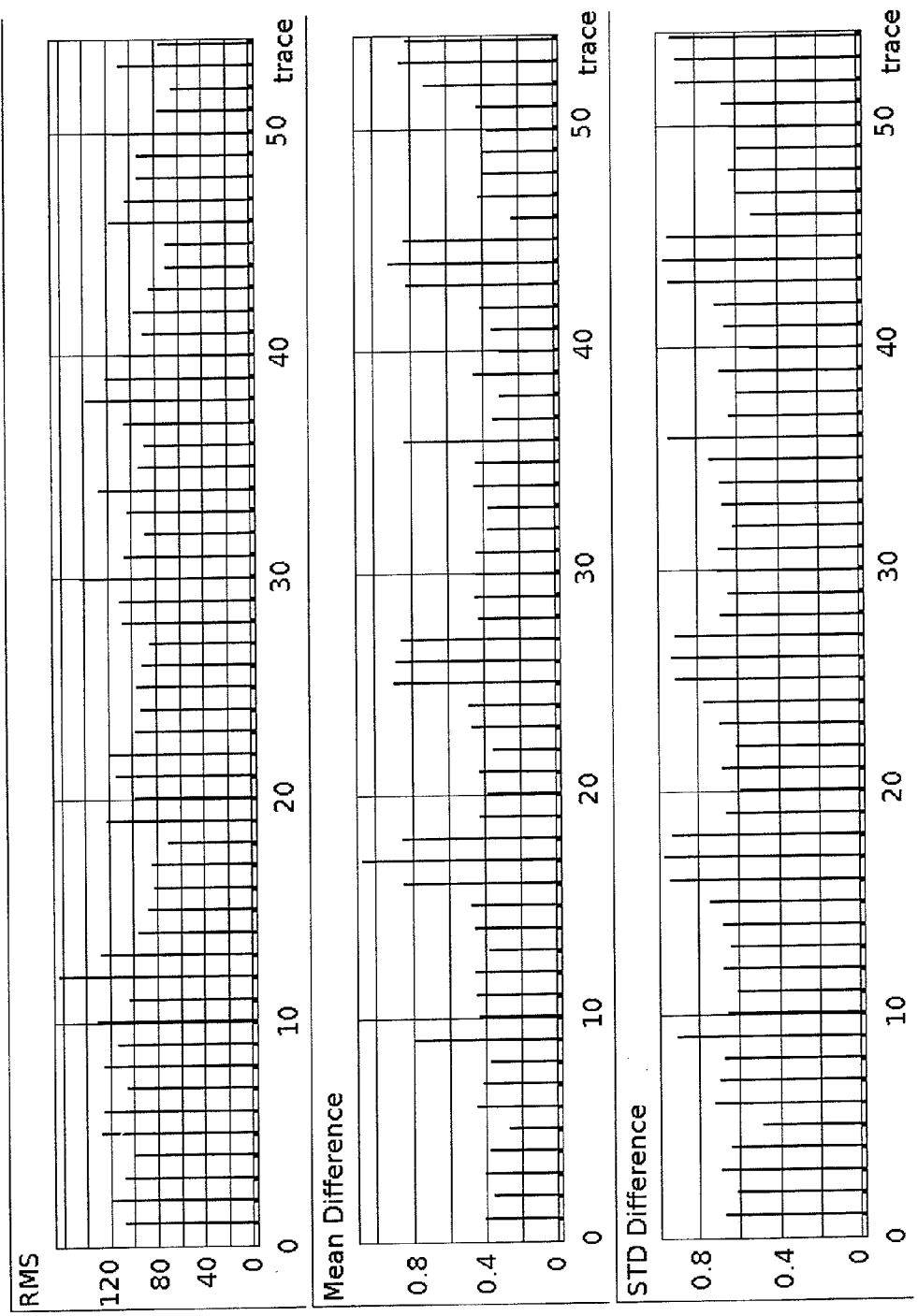
FIGS. 4 and 5 illustrates measurements made using the "Bolt" airgun.

FIG. 4 shows data measured using the Bolt airgun sensor 14 from fifty four different (working) Bolt airguns 12 of different volume. The three graphs are the attributes a), b) and c) in order from top to bottom.

Reasonable spreads of values for functioning airguns can be determined from these measurements. Note that the measurements of attribute b) show two distinct groups of values, corresponding to two different models.

The artefacts measured can be used to estimate the pressure in the charge chamber. This is done essentially by experiment, by plotting a parameter, or "sensor attribute" against the actual pressure in the charge chamber measured using a pressure sensor introduced into the chamber for the calibration.

Figure 5:
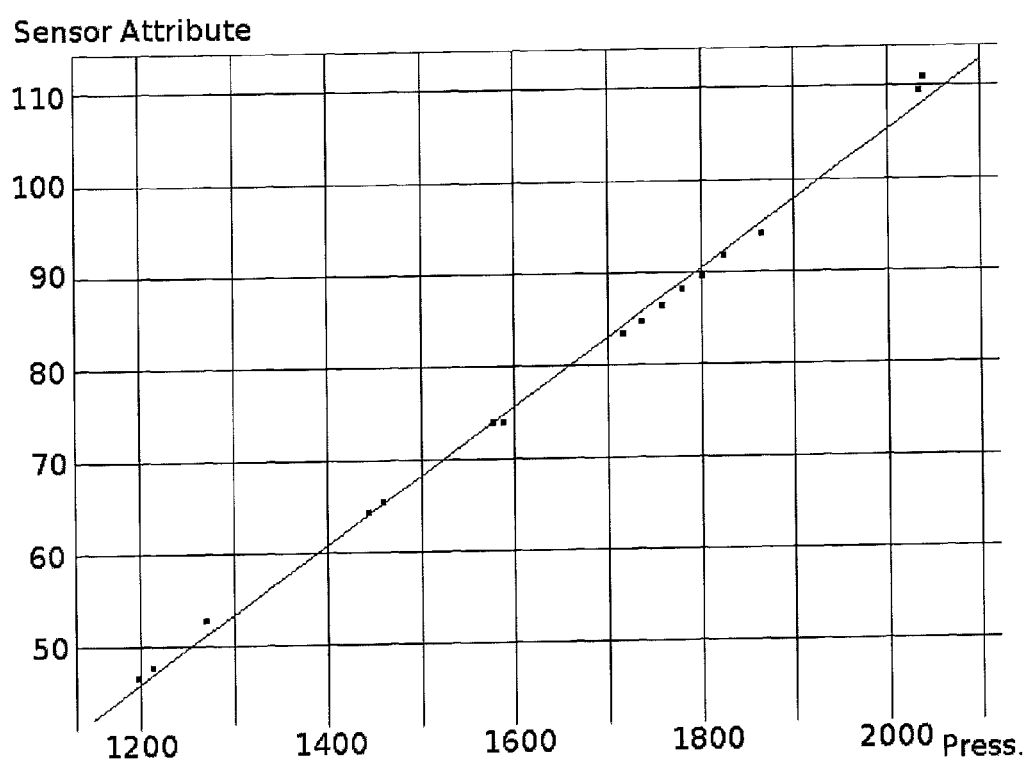

FIG. 5 shows a plot of the sensor attribute against the actual pressure in the charge chamber. It will be seen that an excellent estimate of pressure can be obtained from the graph. In this case the data is produced from a controlled experiment using one single airgun, and the sensor attribute plotted as the y axis is the RMS value (a) above, and the x axis pressure is directly measured using a pressure sensor in the air supply line close to the gun.

Figure 6:
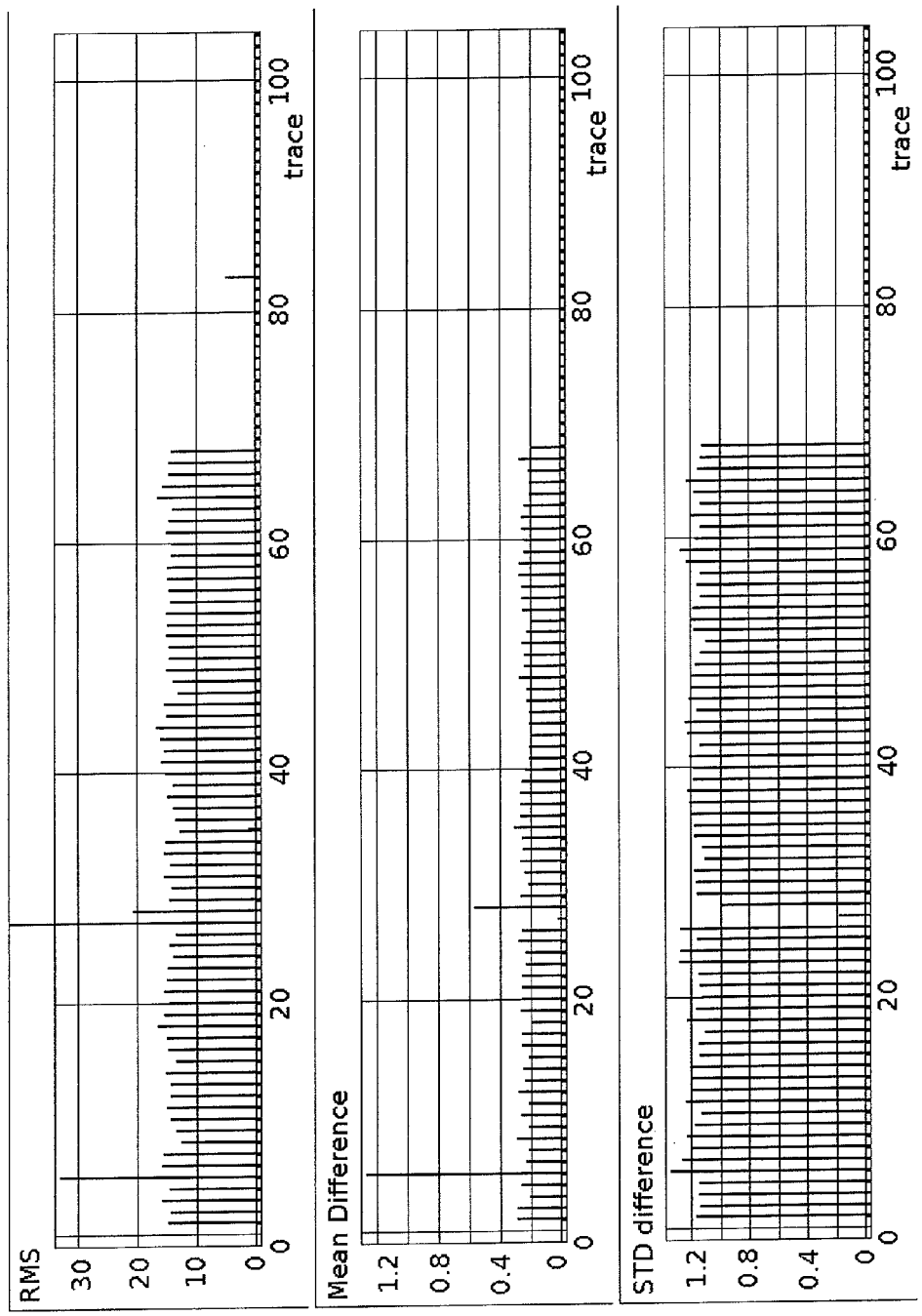
FIGS. 6 and 7 illustrates measurements made using the "Sodera" airgun.

FIG. 6 illustrates similar data measured using Sodera G airguns 12. In this case, not all airguns are functioning properly. Three sensors show clearly aberrant values, airguns five, twenty seven and twenty eight. Note however that the use of only one of the attributes would be less reliable—airgun twenty eight is not clearly aberrant on attribute a) and airgun five is not clearly aberrant on attribute c).

Thus, by combining results from multiple measurements, reasonable monitoring is achieved. If all three attributes show normal values, it is reasonable to assume that the airgun and services are functioning properly.

Figure 7:
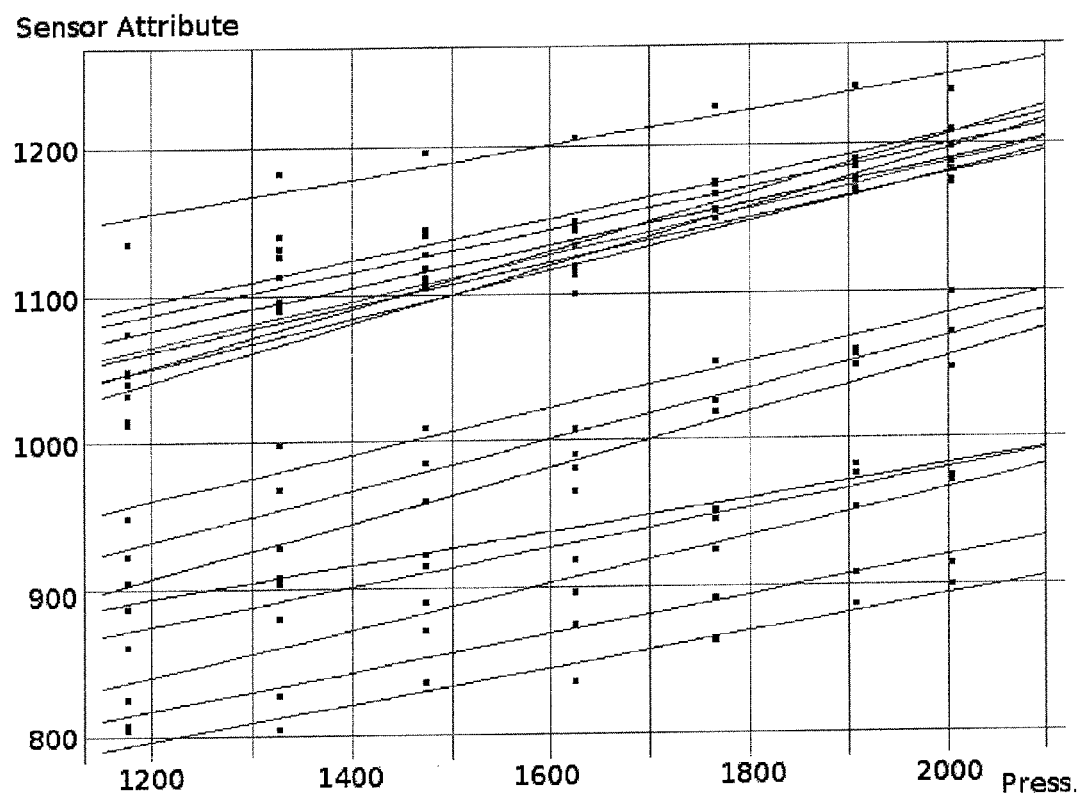

FIG. 7 shows a plot of a combined sensor attribute against pressure in the case of a Sodera G gun. There is some spread in data values, so the sensor attribute cannot be used to obtain an accurate measure of pressure. Nevertheless, the pressure can be estimated sufficiently accurately to detect faulty airguns. This data was produced from an experiment using multiple airguns and the sensor attribute plotted as the y axis is the time between timing peak and return peak. The pressure measurement on the x-axis was made using pressure sensors in each air supply line (one supply line for each 'string' of airguns) on the deployment vessel.

Note that this additional functionality does not require any additional sensors or hydrophones, and can be carried out using measurements that can be calculated for a single data window. This avoids difficulties caused by the volume of data. Aberrant results can be used to identify specific problems with the airgun, sensor or communication lines.

Those skilled in the art will realise that many variations are possible. For example, it may be possible to use only two of the three attributes illustrated above. Although the airguns described are widely used, the invention may also be applied to other airguns.

The invention claimed is:

1. A method of operating a monitoring system for a marine acoustic source, comprising:
    triggering the firing of the marine acoustic source;
    collecting firing data from a timing sensor integrated into the marine acoustic source; and
    monitoring the firing data to detect the firing time of the marine acoustic source;
    wherein the method further comprises signal processing the firing data to monitor the firing pressure in the marine acoustic source to generate a firing pressure value using the root mean square amplitude of an oscillating sensor waveform after firing to generate the firing pressure value; and
    outputting a result based on the signal processing including outputting a firing pressure value.

2. A method according to claim 1, wherein the marine acoustic source re-cocks and re-seals the marine acoustic source after firing, and the step of signal processing the firing data includes using the time between the firing time and the time the marine acoustic source is re-cocked and re-sealed.

3. A method of operating a monitoring system for a marine acoustic source, comprising:
    triggering the firing of the marine acoustic source;
    collecting firing data from a timing sensor integrated into the marine acoustic source; and
    monitoring the firing data to detect the firing time of the marine acoustic source;
    wherein the method further comprises signal processing the firing data to monitor the firing pressure in the marine acoustic source to generate a firing pressure value, wherein the step of signal processing monitors a plurality of artefacts in the data that are dependent on the correct functioning of the marine acoustic source, the artefacts being measured on a sequence of samples of firing data over a window; the artefacts including at least two of:

a) the root mean square value of the amplitude of oscillations in the firing data;

b) the mean of the absolute difference between adjacent samples; and c) the standard deviation of the difference between adjacent samples; and outputting a result based on the signal processing including outputting a firing pressure value.

4. A method according to claim 3 wherein the signal processing reports a fault condition if at least two of the artefacts fall outside respective predetermined ranges of values.

5. A method according to claim 4 wherein the signal processing reports a valid condition if all of the artefacts fall within respective predetermined ranges of values.

6. A computer readable medium, which when read by a computer system causes the computer system to carry out a method with the steps of: triggering the firing of the marine acoustic source;

collecting firing data from a timing sensor integrated into the marine acoustic source; and monitoring the firing data to detect the firing time of the marine acoustic source;

wherein the method further comprises signal processing the firing data to monitor the firing pressure in the marine acoustic source to generate a firing pressure value using the root mean square amplitude of an oscillating sensor waveform after firing to generate the firing pressure value; and outputting a result based on the signal processing including outputting a firing pressure value.

* * * * *